June 28, 1949.  J. A. HENNE  2,474,397
FASTENING MEANS FOR CAMERA COVERS
Filed March 20, 1947  2 Sheets-Sheet 1

INVENTOR.
Julius A. Henne
BY
Harold E. Stonebraker,
his Attorney

June 28, 1949.  J. A. HENNE  2,474,397
FASTENING MEANS FOR CAMERA COVERS
Filed March 20, 1947  2 Sheets-Sheet 2
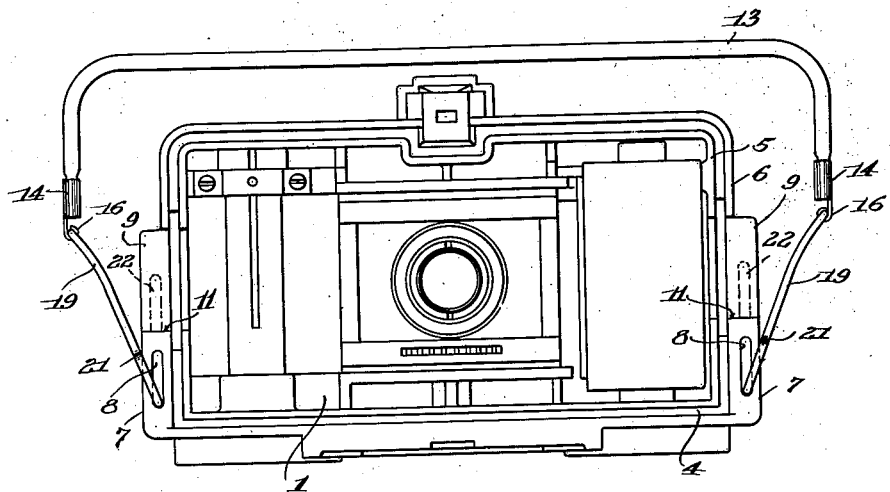
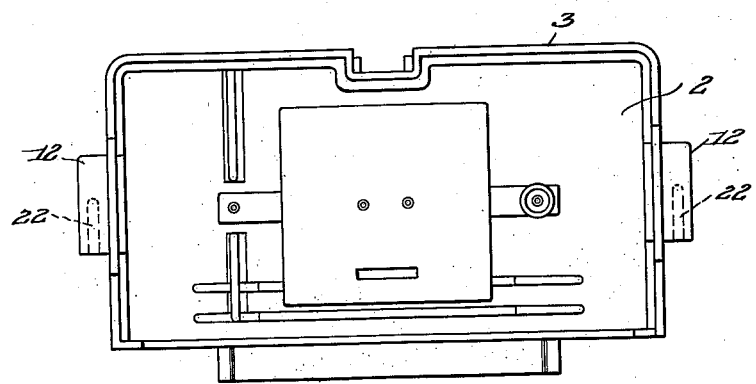
INVENTOR.
Julius A. Henne
BY Harold E. Stonebraker
his Attorney Patented June 28, 1949

2,474,397

UNITED STATES PATENT OFFICE 2,474,397

FASTENING MEANS FOR CAMERA COVERS

Julius A. Henne, Rochester, N. Y., assignor to Webster Industries, Inc., Webster, N. Y., a corporation of New York Application March 20, 1947, Serial No. 735,984

2 Claims. (Cl. 292—91)

1

This invention relates to a photographic film camera, with particular reference to the general type of construction embodying a two-piece camera case consisting of body and cover portions, one removable from the other to permit reloading after a film has been completely exposed, and it has for its purpose to afford a simple and efficient structure for holding the body and cover portions of the case locked in closed operative relation.

A more particular object of the invention is to afford a structure particularly adaptable to a camera case formed of plastic material, although not necessarily confined to use with such material, and which securely holds the two portions of the case in closed relation and precludes the possibility of their accidental separation.

Another purpose of the invention is to afford an arrangement that can be used successfully in conjunction with a plastic camera case and which performs the double function of retaining the separable portions of the case in operative engagement and also constitutes a connection for a handle by which the camera can be conveniently carried.

Still an additional object is to provide a novel connection between a handle and a locking bail movably supported on one of the separable portions of a case, whereby the locking bail is separable from the handle, and when once assembled is firmly held and not subject to accidental or unintentional removal.

To these and other ends, the invention consists in the construction and arrangement of parts that will appear clearly from the following description when read in conjunction with the accompanying drawings, the novel features being pointed out in the claims following the specification.

2

Figure 4:
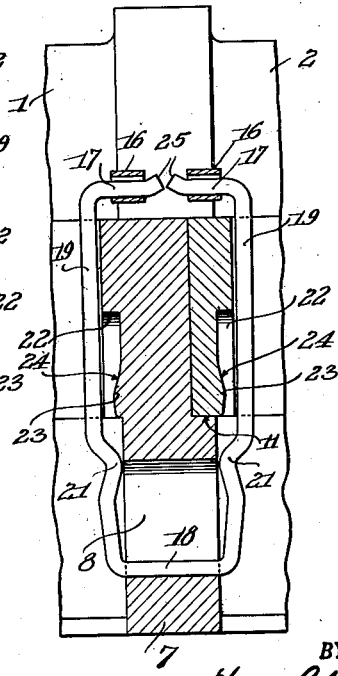
Figure 5:
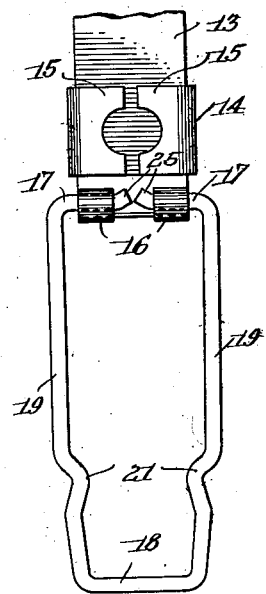

Fig. 4 is a similar sectional view, showing the locking bails in lowered released position to permit separation of the body and cover portions of the case, and the handle connectors elevated into engagewent with the locking bails, about to move them upwardly to locking position;

Fig. 5 is a detail view in elevation showing the handle broken away, the metal connector at one end of the handle, and the wire locking bail mounted on the connector;

Fig. 6 is a view in rear elevation of the body portion of the camera case with the handle and locking bail in lowered released position and the cover portion removed, and Fig. 7 is a view in elevation of the inside of the removable cover portion.

Referring more particularly to the drawings in which like reference numerals refer to the same parts throughout the several views, there is shown a photographic film camera comprising a case preferably formed of plastic material and consisting of two separable portions, that is a body portion as shown in Fig. 6 and designated generally at 1, and a separable cover portion designated generally at 2 and shown in Fig. 7, the body portion 1 being provided with the lens, light chamber, film supporting means, and other conventional parts of the camera. The removable cover portion 2 includes a continuous flange 3 extending around its edge and engaging a mating groove 4 extending around the edge of the body portion 1 and formed by spaced flanges 5 and 6, thus affording a light-tight joint between the body portion 1 and the cover portion 2 when the parts are in closed operative relation.

In order to facilitate and insure correct positioning of the cover and body portions of the case and to lock these parts in operative relation, the body portion includes at each end an extension 7 that is slotted vertically in its lower portion as indicated at 8, and cut away above said slot 8 to afford a portion of reduced thickness 9 at its upper end and a shoulder 11 at the bottom of said reduced portion 9, while 12 designates an extension formed at each end of the cover portion 2. When the cover portion 2 is positioned against the body portion 1 in closed operative relation by a bodily lateral movement, the end extensions 12 overlap and fit closely against the adjacent surfaces of the upper portions 9 of the extensions 7 on the body portion 1 and also against the shoulders 11, as illustrated in Figs. 3 and 4, it being understood that when the parts are in this position, the flange 3 of the cover portion fits into the groove 4 of the body portion of the case, affording a light-tight joint, and when the cover portion is in this position, the camera is ready for operation in the usual fashion.

In order to hold the body and cover portions of the case in closed position, there are provided locking devices, preferably carried by the body portion and connected to a handle, and adjustable to either of two positions. When in one position, the locking devices hold the cover and body portions of the case in operative relationship and also function to support the handle for carrying the camera, and when in their other position release the cover portion and permit it to be separated from the body portion to permit reloading.

To this end, the handle includes a strap of braided fabric or other material suitable for the purpose as indicated at 13, while attached to each end of the strap 13 is a metal connector 14 including clamping portions 15 bent inwardly from the side edges of the connector 14 and engaging the strap 13 to hold the latter, and supporting means for the locking devices comprising lugs 16 bent inwardly from the end of the connector 14. The lugs 16 are spaced from each other as shown and afford cylindrical spaced bearings which receive the separable ends 17 of a wire locking bail that includes a closed end 18 extending through and movable in the slot 8 and sides 19 which include inwardly bent locking projections 21 that are movable in grooves 22 in the portions 9 and 12 and over enlargements 23 into spring engagement with recesses or reduced portions 24, as shown in Fig. 3, and thus holding the portions of the case in locked operative relation.

Figure 1:
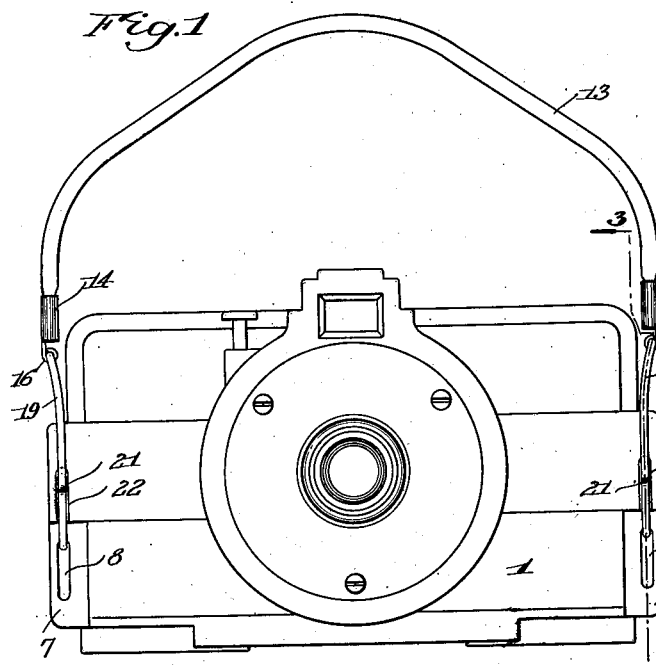
Fig. 1 is a view in front elevation showing a photographic film camera constructed in accordance with a preferred embodiment of the invention, the handle and locking devices appearing in full lines in their uppermost or locking position, and in dotted lines in lowered position to permit separation of the body and cover portions of the camera case.
Figure 2:
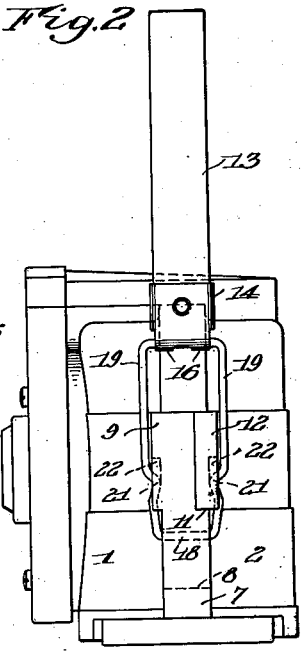
Fig. 2 is an end view of the same showing the handle and locking devices in locking position.
Figure 3:
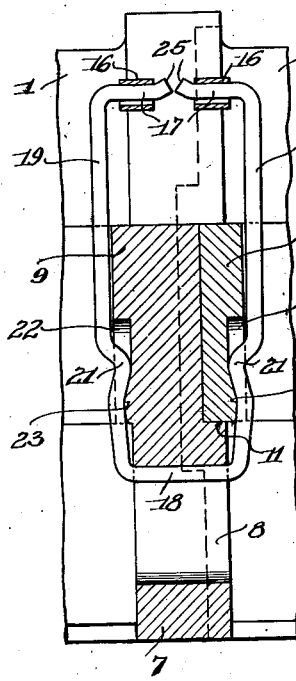
Fig. 3 is a vertical sectional view on the line 3—3 of Fig. 1, showing the locking bails in locking position and the handle connectors lowered into engagement with the locking bails and about to move the latter downwardly to released position.

Assuming the parts to be in the position shown in Fig. 3 and in full lines in Fig. 1, in order to remove the cover portion from the body portion of the case, the metal connectors at the ends of the handle are pushed downwardly to move each wire locking bail in its slot 8 and groove 22 from the position shown in Fig. 3 to the position shown in Fig. 4. In this position, the inwardly bent locking projections 21 on the bail are clear of the recesses 24 and grooves 22, and the bail is free to swing, and then by swinging the upper end of the wire bail outwardly from the case, as indicated by dotted lines in Fig. 1, the movable cover portion is free and can be pulled laterally away from the body portion of the case to expose the interior and permit removal of the film magazine and insertion of a fresh film. The cover portion is then replaced against the body portion of the case by a lateral bodily movement until the two parts are in the position illustrated in Fig. 4, whereupon the wire bails can be swung from the inclined dotted line position shown in Fig. 1 to the vertical position in which they are alined with the grooves 22 containing the enlargements 23 and recesses 24, and the bails are then engaged and pulled upwardly, the projections 21 moving in the grooves 22 until they ride over the enlargements 23 and spring into the recesses 24 in the position shown in Fig. 3, holding the parts in locked relation by the resilient spring action of the sides 19 of the wire bails and the locking projections 21.

The ends 17 of each wire bail are provided with upwardly bent terminal portions 25 that extend upwardly between the bearing lugs 16, as shown in Figs. 3 and 4, and the relation of the upwardly bent terminal portions 25 to the end portions 17 and to the bearings 16 is such as to overcome any tendency of the end portions 17 to move outwardly and become disengaged from the bearings 16. The openings in the bearings or lugs 16 are larger in diameter than the ends 17 of the locking bails sufficiently to permit assembling by pushing the bent extremities 25 and ends 17 through the bearings, the sides 19 of the wire bail being capable of spreading sufficiently to permit such assembly. The sides 19 of the locking bail are first spread apart to permit inserting one end through the slot 8 and the ends 17 are then inserted through the respective bearings 16 while in spread relation, and after being inserted, the locking bail assumes the position shown in Figs. 3 and 4 and the upwardly bent terminal portions 25 act as an effective anchoring means to prevent the ends 17 from spreading away from each other or from becoming disengaged from the bearings in which they are mounted, and the complete assembly insures permanent connection between the handle strap and the locking bails irrespective of any position or movement of the strap 13.

Thus when the handle and the connected locking bails are in the vertical position illustrated in Fig. 1, the cover portion is securely locked on the body portion of the case and there is no chance of the parts becoming accidentally disengaged, since the spring action of the locking bails is sufficient to prevent displacement. When desired to separate the portions of the case, this can be easily and quickly effected by moving the ends of the handle and the locking bails downwardly against the resistance of the locking recesses 24 and enlargements 23 until the bails are out of engagement with the grooves and locking portions of the extensions on the case, permitting the ends of the handle to be swung outwardly with the upper ends of the locking bails, and thus allowing the cover portion to be removed.

While the invention has been described with reference to the particular embodiment illustrated, it is not confined to the details shown, and this application is intended to cover such modifications or departures as may come within the purposes of the improvement or the scope of the following claims.

I claim:

1. In a photographic camera, the combination with a case comprising separable body and cover portions, of overlapping extensions at the ends of said body and cover portions, said extensions having oppositely arranged grooves in their outer surfaces with locking recesses therein and the extensions on one of said portions having slots therein in alinement with said grooves, and a wire bail movable endwise in each of said slots and having sides with locking projections movable in said grooves into locking engagement with said recesses, the bail being movable laterally away from said extensions and locking recesses when at the bottom of said slot to permit separation of the body and cover portions.

2. In a photographic camera, the combination with a case comprising separable body and cover portions, of overlapping extensions at the ends of said body and cover portions, said extensions having oppositely arranged grooves in their outer surfaces with locking recesses therein and the extensions on one of said portions having slots therein in alinement with said grooves, a wire bail movable endwise in each of said slots and having sides with locking projections movable in said grooves into locking engagement with said recesses, the upper end of the bail being movable laterally away from said extensions and locking recesses when at the bottom of said slot to permit separation of the body and cover portions, and a handle attached at its ends to the upper ends of said bails, the handle acting when lowered to limit lateral movement of the bails and when lifted to retain the bails in locking position.

JULIUS A. HENNE.

REFERENCES CITED

The following references are of record in the file of this patent:

UNITED STATES PATENTS

| Number | Name | Date |
|---|---|---|
| 633,896 | Page | Sept. 26, 1899 |
| 823,071 | Nelson | June 12, 1906 |
| 1,068,232 | Fish | July 22, 1913 |
| 1,149,156 | Benka | Aug. 3, 1915 |
| 1,192,564 | Rogers | July 25, 1916 |
| 1,218,135 | Underwood et al. | Mar. 6, 1917 |
| 1,351,325 | Catlin | Aug. 31, 1920 |
| 2,083,621 | Smith | June 15, 1937 |
| 2,349,926 | Appel | May 30, 1944 |